United States Patent Office 2,801,667
Patented Aug. 6, 1957

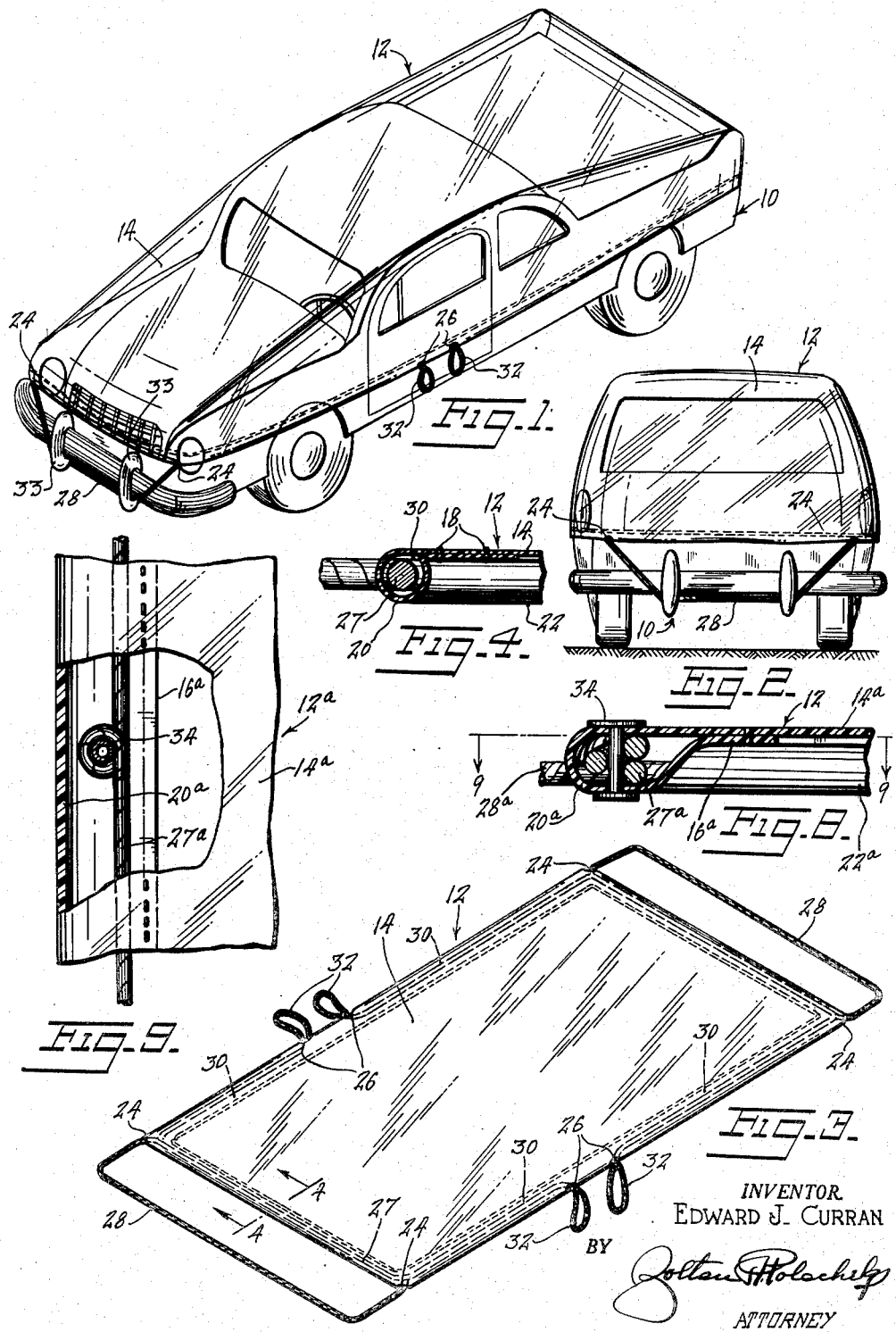

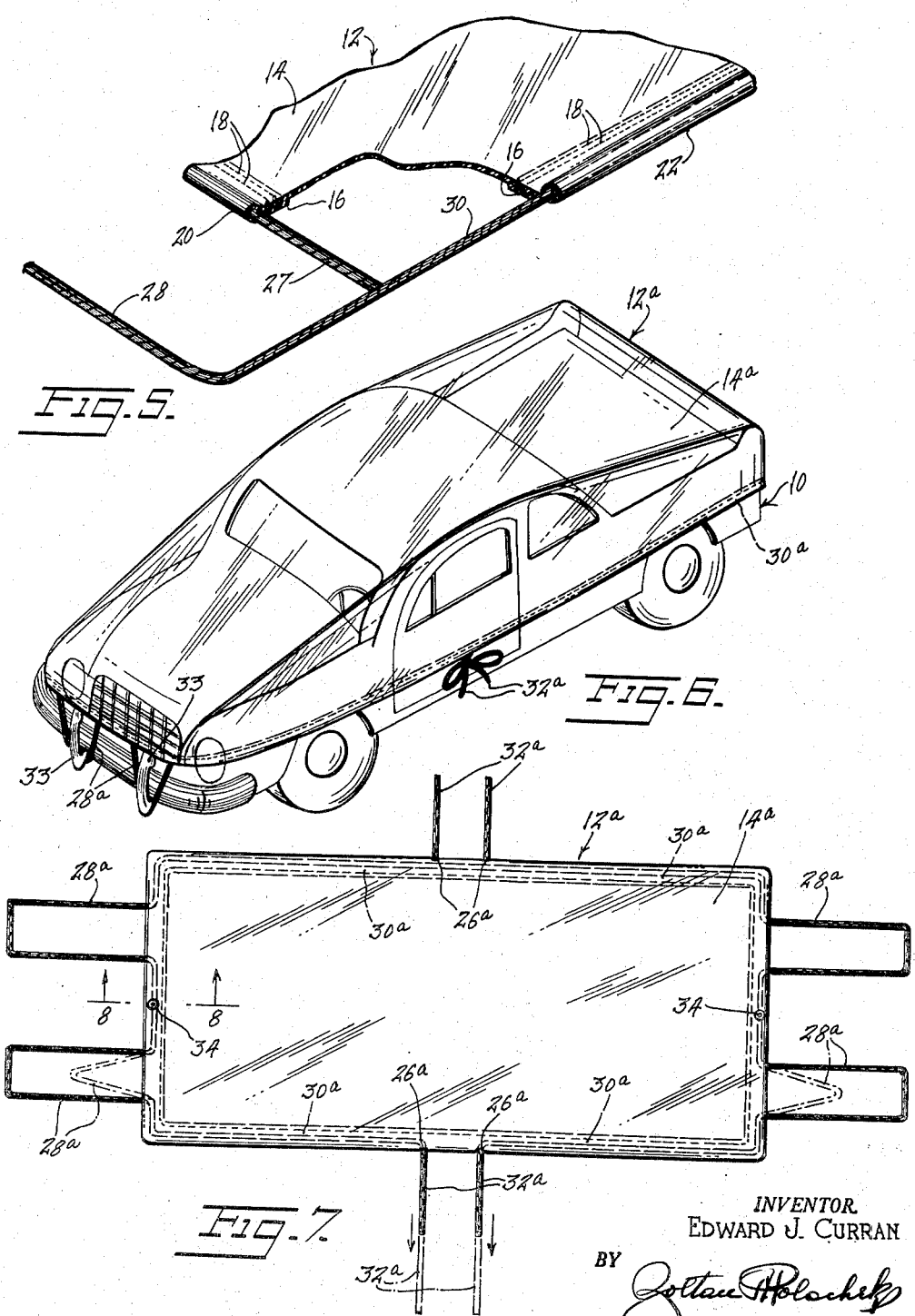

2,801,667

PROTECTIVE COVER FOR AUTOMOBILES

Edward J. Curran, New York, N. Y.

Application October 18, 1955, Serial No. 541,144

5 Claims. (Cl. 150—52)

This invention relates to a protective covering for automobiles and similar vehicles and, more particularly, has reference to a covering of the type referred to which is adapted to be applied to and removed from an automobile with maximum facility, said cover, when applied to the automobile, being adapted to overlie the greatest portion of the body thereof to protect the same against dust and the elements.

While it is not broadly new to provide a protective, removable, lightweight covering of a highly flexible fabric or similar material for automobiles, heretofore, in many instances, the coverings have been so designed as to render difficult the application or removal thereof. Further, in some instances the construction has been excessively complicated, thus rendering the covering unsuited for commercial production.

The main object of the present invention is to provide a generally improved protective covering of the type referred to, that will be characterized by its ease of application or removal, and will be further so designed as to permit the same to be manufactured at a minimum of cost.

Another object is to provide a covering as described which is adapted to be swiftly applied to automobiles of various sizes, makes, and body types, without requiring modification or redesign of the covering to suit particular automobiles.

Still another object is to provide a covering which will be particularly designed to cause the same to be tensioned over the automobile in a longitudinal direction by engagement of depending loops, provided at opposite ends of the covering, over the grill or bumper guards customarily provided at the front and rear of the vehicle.

Another object is to provide, at opposite sides of the covering, means facilitating the pulling down of the covering over the side portions of the vehicle body.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an automobile over which has been applied a protective covering formed according to the present invention.

Fig. 2 is a rear elevational view of the automobile with the cover applied thereto.

Fig. 3 is a perspective view of the cover per se, in a flattened condition.

Fig. 4 is an enlarged, detail sectional view on line 4—4 of Fig. 3.

Fig. 5 is an enlarged, fragmentary perspective view showing one corner of the cover.

Fig. 6 is a perspective view of the vehicle with a modified form of covering applied thereto.

Fig. 7 is a top plan view of the modified covering shown in Fig. 6, the dotted lines showing one of the loops at opposite ends of the vehicle as it appears when adjusted to a contracted condition.

Fig. 8 is an enlarged, fragmentary, detail sectional view on line 8—8 of Fig. 7.

Fig. 9 is an enlarged, plan sectional view substantially on line 9—9 of Fig. 8.

In the form of the invention shown in Figs. 1–5, the vehicle has been generally designated 10, and the covering applied thereto has been generally designated at 12. The covering includes a waterproof, flexible, rectangular body 14 of substantial area, the length and width of said body being such as to permit the same to be tensioned over the vehicle in the manner shown in Fig. 1, with the side portions of the body being pulled down over the sides of the vehicle to a location adjacent the lower edge of the vehicle body. The body 14 is preferably formed of a thin, inexpensive material, such as a plastic sheet, and may be wholly transparent as shown, or alternatively, opaque or, if desired, of tinted transparent material to counteract the effect of the rays of the sun. In any event, the body is so designed as to permit the same to be rolled up or folded into a compact article, readily capable of storage in a comparatively small area within the vehicle trunk or other desired location.

Throughout its periphery, the body 14 is provided with an underlying hem 16, provided by folding inwardly the edge portions of the body and stiffening the same by parallel lines of stitching 18. This provides a tubular, continuous, depending sleeve 20 extending over the full width of the body, at each end thereof. The hemming of the marginal part of the body further defines side sleeves or tubes 22 extending the full length of the body and communicating at their opposite ends with the ends of the transverse sleeves 20.

At the several corners of the body, the same is cut away diagonally to provide corner openings 24 communicating with the respective sleeves at the juncture thereof. Further, intermediate opposite ends of the body, at each side thereof, closely spaced openings 26 are formed, communicating with the side sleeves or tubes 22.

Extending through the end sleeves 20 are ropes 27, forming end flexible elements, and at their opposite ends, the end elements 27 are connected to U-shaped loops 28, the leg portions of which project through the corner openings 24, with the bight portions of the loops extending the full width of the body as shown in Fig. 3 and being disposed well outwardly from the adjacent ends of the body.

Further, the end elements 27 at their opposite ends are connected to the respective ends of side elements 30, also formed from rope or similar flexible material, and as shown in Fig. 5 the side elements 30 can if desired be formed integrally with the legs of the loops 28.

The side elements 30, at each side of the covering, have their inner end portions extended through the openings 26, and the projecting parts of the end portions of the side elements 30 are knotted and formed into loops to provide handles 32.

In use, the covering is unfolded and stretched out flat as in Fig. 3, after which it is thrown over the top of the vehicle with the loops 28 being loosely engaged about the bumper or guards 33 of the vehicle. In this connection, the flexible elements 27, 28, 30 may be formed of an elasticized rope material, thus to further aid in the tensioning of the covering over the vehicle body.

Then, the sides of the covering are pulled down over the sides of the vehicle by grasping the handles 32, with one side first being pulled down and then the other. This completes the application of the protective covering to the vehicle, and as will be noted from Fig. 1, the vehicle is covered over substantially the full area of the body, being thus protected against the deteriorating effects of dust and the elements.

Of course, other modes of application are possible, and if desired, the covering can be rolled up, with one loop 28 first being engaged under the front or rear bumper guards, and with the covering then being unrolled progressively in a longitudinal direction until it is fully unrolled with the other loop disposed for engagement under the other bumper guard preliminary to pulling down of the side portions of the covering.

In Figs. 6-9 there is shown a modified construction wherein the covering has been generally designated 12ª. In this form of the invention, the covering again constitutes a rectangular, flexible waterproof body of large area, designated at 14ª and having a continuous, underlying peripheral hem 16ª defining end sleeves 20ª and side sleeves 22ª. In this form of the invention, the corner openings are not required, but the side openings 26ª are provided, disposed similarly to the side openings 26 in the first form of the invention.

As shown in Fig. 7 and also in Fig. 6, instead of a single end loop at each end of the article, there is provided a pair of transversely spaced loops 28ª, one for each bumper guard 33. Four transversely spaced openings are provided in the tubular passage 20ª, through which the legs of the loops 28ª extend.

Two flexible elements can be used in providing the necessary means for tensioning the cover in position over the vehicle. Thus, one flexible element has a side portion 30ª at one end portion of the covering, with said portion 30ª extending through one of the openings 26ª and projecting outwardly from the covering to provide a handle 32ª which also constitutes a tie in a manner to be presently made apparent. At its other end, the side portion 30ª is extended about the adjacent corner of the covering 14ª, and merges into the adjacent leg of the end loop 28ª disposed at the same side of the covering. Then, the other leg of said loop 28ª extends to a grommet 34 extending vertically through the passage 20ª medially between the opposite sides of the protective covering, and is coiled about the grommet as shown in Figs. 8 and 9, with the grommet being clampably engaged with the convolutions of the coiled part so as to prevent slippage or rotational movement of said convolutions about the grommet. Then, the flexible element is continued past the grommet to be formed into the other end loop 28ª at the same end of the protective covering, and the loop 28ª last mentioned is merged into a side portion 30ª extending along the other side of the body 14ª, and projecting through one of the openings 26ª to provide a tie or handle 32ª at the other side of the vehicle.

At the other end of the device, a second flexible element is used, and this is arranged similarly to the element provided at the left-hand end of the device viewing the same as in Fig. 7, to provide end loops 28ª adapted to engage under the rear bumper guards of the vehicle.

In use of this form of the covering, the covering is tensioned over the vehicle in the same manner as previously described, but at the outset, the loops 28ª will merely fit loosely under the bumper guards 33 at opposite ends of the vehicle. Then, by pulling outwardly upon the ties 32ª at one side, the loops 28ª at opposite ends of the covering, disposed at the same side of the vehicle, will be tensioned about their associated bumper guards, as shown in dotted lines in Fig. 7. After the loops have been tensioned in this manner, the ties that have been pulled outwardly in the direction of the arrows shown in Fig. 7 are tied together as shown in Fig. 6.

The same operation is carried out at the opposite side of the vehicle, to tension the covering at said opposite side, and after the ties 32ª have been connected at both sides of the vehicle, the covering will be securely engaged about the top and side surfaces of the vehicle body.

It will be seen that the device thus is readily adaptable to being fitted over vehicles of different sizes, makes, or body types, and in each instance the covering will be securely tensioned in position about the vehicle, so that it will not be subject to disturbance by the wind, and will not fit so loosely about the vehicle as to permit dust to enter between the covering and the vehicle body and it may also be used as a tent by securing it to four or more suitable poles.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A protective covering for vehicles comprising: a flexible body of a size sufficient to overlie the major portion of the area of an automobile, loops projecting beyond opposite ends of said body, side flexible elements connected to the loops and extending along opposite sides of the body, and handles projecting laterally outwardly from the body and connected to said elements, said handles constituting extensions of the side elements, the side elements having connections at one end to the respective loops and the handles being formed at the other ends of the side elements, there being two handles at each side of the covering spaced closely apart longitudinally of the covering and free of connections to one another, said loops being generally U-shaped and being adapted to engage under bumper guards of the vehicle at opposite ends of the vehicle, there being two loops at each end of the body with each loop of an end being adapted for engagement under a single bumper guard.

2. A protective covering for vehicles comprising: a flexible body of a size sufficient to overlie the major portion of the area of an automobile, loops projecting beyond opposite ends of said body, side flexible elements connected to the loops and extending along opposite sides of the body, and handles projecting laterally outwardly from the body and connected to said elements, said handles constituting extensions of the side elements, the side elements having connections at one end to the respective loops and the handles being formed at the other ends of the side elements, there being two handles at each side of the covering spaced closely apart longitudinally of the covering and free of connections to one another, said loops being generally U-shaped and being adapted to engage under bumper guards of the vehicle at opposite ends of the vehicle, there being two loops at each end of the body with each loop of an end being adapted for engagement under a single bumper guard, said covering including end elements extending transversely of the body at opposite ends thereof and connected to one end of the loops, the side elements being connected to the other ends of the loops, each of said end elements being anchored medially between opposite sides of the body with one loop of an end disposed at one side of the anchored portion of the associated end element and the other loop of the same end being disposed at the other side of said anchored portion.

3. A protective covering for vehicles comprising: a flexible body of a size sufficient to overlie the major portion of the area of an automobile, loops projecting beyond opposite ends of said body, side flexible elements connected to the loops and extending along opposite sides of the body, and handles projecting laterally outwardly from the body and connected to said elements, said handles constituting extensions of the side elements, the side elements having connections at one end to the respective loops and the handles being formed at the other ends of the side elements, there being two handles at each side of the covering spaced closely apart longitudinally of the covering and free of connections to one another, said loops being generally U-shaped and being adapted to engage under bumper guards of the vehicle at opposite ends of the vehicle, there being two loops at each end of the body with each loop of an end being adapted for engagement under a single bumper guard, said covering including end elements extending transversely of the body at opposite ends thereof and connected to one end of the loops, the side elements being connected to the other ends of the loops, each of said end elements being anchored medially between opposite sides of the body with one loop of an end disposed at one side of the anchored portion of the associated end element and the other loop of the same end being disposed at the other side of said anchored portion, the anchoring of the end elements comprising grommets secured to the body, each end element being coiled about its associated grommet and said associated grommet being clampably engaged with the convolutions of the end element.

4. A protective covering for vehicles comprising: a flexible body of a size sufficient to overlie the major portion of the area of an automobile, loops projecting beyond opposite ends of said body, side flexible elements connected to the loops and extending along opposite sides of the body, and handles projecting laterally outwardly from the body and connected to said elements, said handles constituting extensions of the side elements, the side elements having connections at one end to the respective loops and the handles being formed at the other ends of the side elements, there being two handles at each side of the covering spaced closely apart longitudinally of the covering and free of connections to one another, said loops being generally U-shaped and being adapted to engage under bumper guards of the vehicle at opposite ends of the vehicle, there being two loops at each end of the body with each loop of an end being adapted for engagement under a single bumper guard, said covering including end elements extending transversely of the body at opposite ends thereof and connected to one end of the loops, the side elements being connected to the other ends of the loops, each of said end elements being anchored medially between opposite sides of the body with one loop of an end disposed at one side of the anchored portion of the associated end element and the other loop of the same end being disposed at the other side of said anchored portion, the anchoring of the end elements comprising grommets secured to the body, each end element being coiled about its associated grommet and said associated grommet being clampably engaged with the convolutions of the end element, each side element extending between one of said handles and one of the loops, whereby, on pulling of the handles at one side of the covering, a single loop at each end of the covering will be tensioned about its associated bumper guard.

5. A protective covering for vehicles comprising: a flexible body of a size sufficient to overlie the major portion of the area of an automobile, loops projecting beyond opposite ends of said body, side flexible elements connected to the loops and extending along opposite sides of the body, and handles projecting laterally outwardly from the body and connected to said elements, said handles constituting extensions of the side elements, the side elements having connections at one end to the respective loops and the handles being formed at the other ends of the side elements, there being two handles at each side of the covering spaced closely apart longitudinally of the covering and free of connections to one another, said loops being generally U-shaped and being adapted to engage under bumper guards of the vehicle at opposite ends of the vehicle, there being two loops at each end of the body with each loop of an end being adapted for engagement under a single bumper guard, said covering including end elements extending transversely of the body at opposite ends thereof and connected to one end of the loops, the side elements being connected to the other ends of the loops, each of said end elements being anchored medially between opposite sides of the body with one loop of an end disposed at one side of the anchored portion of the associated end element and the other loop of the same end being disposed at the other side of said anchored portion, the anchoring of the end elements comprising grommets secured to the body, each end element being coiled about its associated grommet and said associated grommet being clampably engaged with the convolutions of the end element, each side element extending between one of said handles and one of the loops, whereby, on pulling of the handles at one side of the covering, a single loop at each end of the covering will be tensioned about its associated bumper guard, the handles of each side being adapted to be tied together following pulling of the same to tension the associated loops connected thereto, to maintain the tensioned engagement of the several loops with the bumper guards for pulling the covering tight over the vehicle.

References Cited in the file of this patent

UNITED STATES PATENTS

| | | |
|---|---|---|
| 2,279,812 | Bartlett | Apr. 14, 1942 |
| 2,570,533 | Elliott | Oct. 9, 1951 |
| 2,646,097 | Gaverth et al. | July 21, 1953 |